(12) United States Patent
Isenberg et al.

(10) Patent No.: US 10,079,847 B2
(45) Date of Patent: Sep. 18, 2018

(54) ADAPTIVE AUTOMATIC EMAIL DOMAIN NAME CORRECTION

(71) Applicant: LMP Software, LLC, Woodland Hills, CA (US)

(72) Inventors: Henri J. Isenberg, Los Angeles, CA (US); Ronald B. Laughton, Oak Park, CA (US); Timothy J. Cashin, Santa Monica, CA (US)

(73) Assignee: LMP Software, LLC, Woodland Hills, CA (US)

( * ) Notice: Subject to any disclaimer, the term of this patent is extended or adjusted under 35 U.S.C. 154(b) by 0 days.

(21) Appl. No.: 15/481,389

(22) Filed: Apr. 6, 2017

(65) Prior Publication Data

US 2017/0295134 A1    Oct. 12, 2017

Related U.S. Application Data

(60) Provisional application No. 62/320,162, filed on Apr. 8, 2016.

(51) Int. Cl.
| | |
|---|---|
| *H04L 12/58* | (2006.01) |
| *H04L 29/06* | (2006.01) |
| *G06F 17/30* | (2006.01) |
| *H04L 29/08* | (2006.01) |
| *H04L 29/12* | (2006.01) |

(52) U.S. Cl.
CPC .... *H04L 63/1425* (2013.01); *G06F 17/30477* (2013.01); *H04L 51/28* (2013.01); *H04L 63/126* (2013.01); *H04L 51/22* (2013.01); *H04L 61/307* (2013.01); *H04L 63/101* (2013.01); *H04L 63/1483* (2013.01); *H04L 67/10* (2013.01)

(58) Field of Classification Search
CPC ......... H04L 51/28; H04L 51/30; H04L 51/14; H04L 63/168; H04L 63/0236; H04L 29/12132; H04L 61/1552; G06Q 10/107; G06F 2221/2119
USPC ........................................................ 709/206
See application file for complete search history.

(56) References Cited

U.S. PATENT DOCUMENTS

| | | | |
|---|---|---|---|
| 6,654,789 | B1 | 11/2003 | Bliss et al. |
| 6,839,738 | B2 | 1/2005 | Quine et al. |
| 6,895,427 | B2 | 5/2005 | Quine et al. |
| 6,973,507 | B2 * | 12/2005 | Yoon ................ H04L 29/12066 709/220 |
| 7,149,780 | B2 | 12/2006 | Quine et al. |

(Continued)

*Primary Examiner* — Aftab N. Khan
(74) *Attorney, Agent, or Firm* — Mark A. Goldstein; SoCal IP Law Group LLP (57) ABSTRACT

A system and methods for correcting domain names in invalid email addresses are described herein. The method includes receiving email failure information including a bad domain name. The bad domain name is compared to valid domain names in a valid domain name database and a match distance of the bad domain name to valid domain names in the valid domain name database is evaluated. Confidence scores for the valid domain names are prepared based on the match distance. Valid domain names having confidence scores exceeding a domain match threshold are identified. A valid domain name with a confidence score exceeding the domain match threshold is selected. The method involves heuristics and machine learning. System administrator intervention may be received to assist in the selecting. An email note is sent to the corrected domain name.

18 Claims, 6 Drawing Sheets

| Invalid Domain | Valid Domains | Distance | Confidence Score | |
|---|---|---|---|---|
| Vmail.com | Gmail.com | 1 | 89% | |
| | Hotmail.com | 3 | 73% | ← Domain Match Threshold |
| | Aol.com | 3 | 57% | |
| | Yahoo.com | 5 | 44% | |
| | Live.com | 5 | 37% | |

© 2017 LMP Software, LLC (56) References Cited

U.S. PATENT DOCUMENTS

| | | | |
|---|---|---|---|
| 7,320,019 B2 | 1/2008 | Malik | |
| 7,543,026 B2 | 6/2009 | Quine et al. | |
| 7,689,654 B2 | 3/2010 | Walter et al. | |
| 7,966,310 B2* | 6/2011 | Sullivan | G06F 17/30887 |
| | | | 707/709 |
| 2002/0042815 A1 | 4/2002 | Salzfass et al. | |
| 2002/0087647 A1* | 7/2002 | Quine | G06Q 10/107 |
| | | | 709/206 |
| 2002/0188690 A1 | 12/2002 | Lee | |
| 2003/0163567 A1* | 8/2003 | McMorris | H04L 29/06 |
| | | | 709/225 |
| 2004/0003115 A1* | 1/2004 | Mason | H04L 29/12132 |
| | | | 709/245 |
| 2005/0149507 A1* | 7/2005 | Nye | G06F 17/30864 |
| 2005/0262209 A1* | 11/2005 | Yu | H04L 51/12 |
| | | | 709/206 |
| 2006/0112094 A1* | 5/2006 | Sullivan | G06F 17/30887 |
| 2006/0212522 A1* | 9/2006 | Walter | H04L 51/30 |
| | | | 709/206 |
| 2007/0239701 A1* | 10/2007 | Blackman | G06F 17/30864 |
| 2008/0034073 A1* | 2/2008 | McCloy | H04L 63/0236 |
| | | | 709/223 |
| 2008/0040432 A1* | 2/2008 | Murphy | G06Q 10/107 |
| | | | 709/206 |
| 2009/0307315 A1* | 12/2009 | Murphy, Jr. | G06Q 10/107 |
| | | | 709/206 |
| 2011/0004850 A1* | 1/2011 | Lodico | G06Q 30/02 |
| | | | 715/838 |

* cited by examiner

ADAPTIVE AUTOMATIC EMAIL DOMAIN NAME CORRECTION

RELATED APPLICATION INFORMATION

This patent claims priority from U.S. provisional patent application 62/320,162 filed Apr. 8, 2016, the contents of which are incorporated by reference herein.

NOTICE OF COPYRIGHTS AND TRADE DRESS

This patent document contains material which is subject to copyright protection. This patent document may show and/or describe matter which is or may become trade dress of the owner. The copyright and trade dress owner has no objection to the reproduction by anyone of the patent disclosure as it appears in the Patent and Trademark Office patent files or records, but otherwise reserves all copyright and trade dress rights whatsoever.

BACKGROUND

Field

This disclosure relates to email addresses, the domain names specified in email addresses and automatically correcting domain names or suggesting likely correct domain names in response to a failed email attempt.

Description of the Related Art

The use of electronic mail or email has become widespread. When an email note is sent, an email address is specified. The email address includes a user name and a domain name separated by an @ symbol. The domain name typically includes a second level portion and a top level portion. The email address is username@secondlevel.toplevel. If the user name or either portion of the domain name is misspelled or is otherwise incorrect, the email is not delivered to the intended recipient. Sometimes this is due to a spelling error. In a commercial setting this could result from a data entry error.

When either the second level domain or the top level domain is spelled incorrectly, the email note is returned undeliverable. Historically, there were a limited number of top level domains such as .edu, .com, .gov, .org and .net. Well known second level domain names paired with the .com top level domain name include gmail.com, yahoo.com, hotmail.com and many others. Plus, most companies hold rights to their name in domain name form, such as, for example, google.com, samsung.com, apple.com, microsoft.com, and many others. Top level domains are expanding to include and support common English language words as well as words in other languages. Companies have also acquired rights to use their brand names as top level domains, such as, for example, .google, .hyatt, and .bloomberg, Others have acquired top level domains for groups or marketing purposes, including, for example, .lawyer, .healthcare .hiphop, .money, .review, and many others. The more these new top level domains are used, the more likely there will be typographical or other errors in top level domain names included in email addresses.

When large audience email notes are sent, there are certain numbers of email addresses that are erroneous and result in undeliverable email. On this larger scale, when sent by a commercial enterprise, the numbers of undeliverable email notes result in a not insignificant audience of subscribers, potential customers or clients that do not receive the intended email.

DETAILED DESCRIPTION

Systems and methods to correct domain names are described herein. The methods are particularly useful in automatically correcting or suggesting corrections for traditional second level domain names and newer, English and other language top level and other level domain names.

Environment

Figure 1:
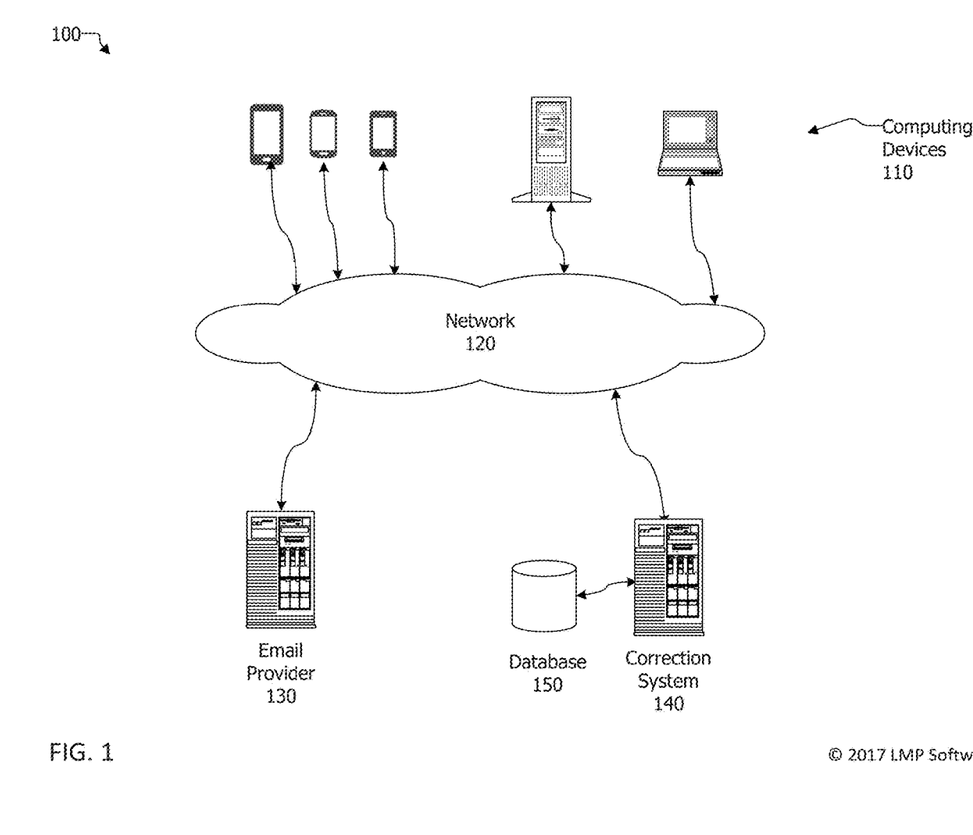
FIG. 1 is a block diagram of an environment in which the domain name correction system and methods described herein is implemented.

Referring now to FIG. 1, there is shown a block diagram of an environment 100 in which a domain name correction system and methods described herein is implemented. The methods described herein may be implemented on one or more server computers referred to herein as correction system 140. A server computer includes software and hardware for providing the functionality and features described herein. A server computer may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The methods, functionality and features described herein may be embodied in software which operates on a server computer and may be in the form of firmware, an application program, an applet (e.g., a Java applet), a browser plug-in, a COM object, a dynamic linked library (DLL), a script, one or more subroutines, or an operating system component or service.

The correction system 140 includes or is coupled with databases of good or valid domain names and bad or invalid domain names. In addition, earlier corrections of invalid domain names with valid domain names may be stored in a database. The valid domain name database may be seeded with or start with certain well known domain names that may be obtained from one or more third parties or may be created by the maintainer of the correction system. These databases are shown as database 150 coupled with correction system 140. The databases may be implemented using the structured query language more commonly known as SQL or MySQL as well as other database software. The hardware and software and their functions may be distributed such that some are performed by one server computer and others by other server computers. The correction system 140 and the software may access third party email systems such as email provider 130 via network 120. Notices about failed email may be received from the third party email systems.

Although shown and described as implemented in a server computer, the processes may be implemented with any computing device. A computing device as used herein refers to any device with a processor, memory and a storage device that executes instructions including, but not limited to, personal computers, server computers, computing tablets, smart phones, portable computers, and laptop computers. These computing devices may run an operating system, including, for example, variations of the Linux, Microsoft Windows, and Apple Mac operating systems.

The techniques may be implemented in software and stored on a machine readable storage medium in a storage device included with or otherwise coupled or attached to correction system 140 or other computing device. That is, the software may be stored on machine readable storage media. These storage media include various kinds of physical media, namely: magnetic media such as hard disk drives (HDDs); optical media such as compact disks (CD-ROM and CD-RW) and digital versatile disks (DVD and DVD±RW); silicon media such as solid-state drives (SSDs) and flash memory cards; and other magnetic, optical or silicon storage media. As used herein, a storage device is a device that allows for reading and/or writing to a storage medium. Storage devices include hard disk drives, DVD drives, SSDs, flash memory devices, and other magnetic, silicon, optical or other physical media.

Figure 2:
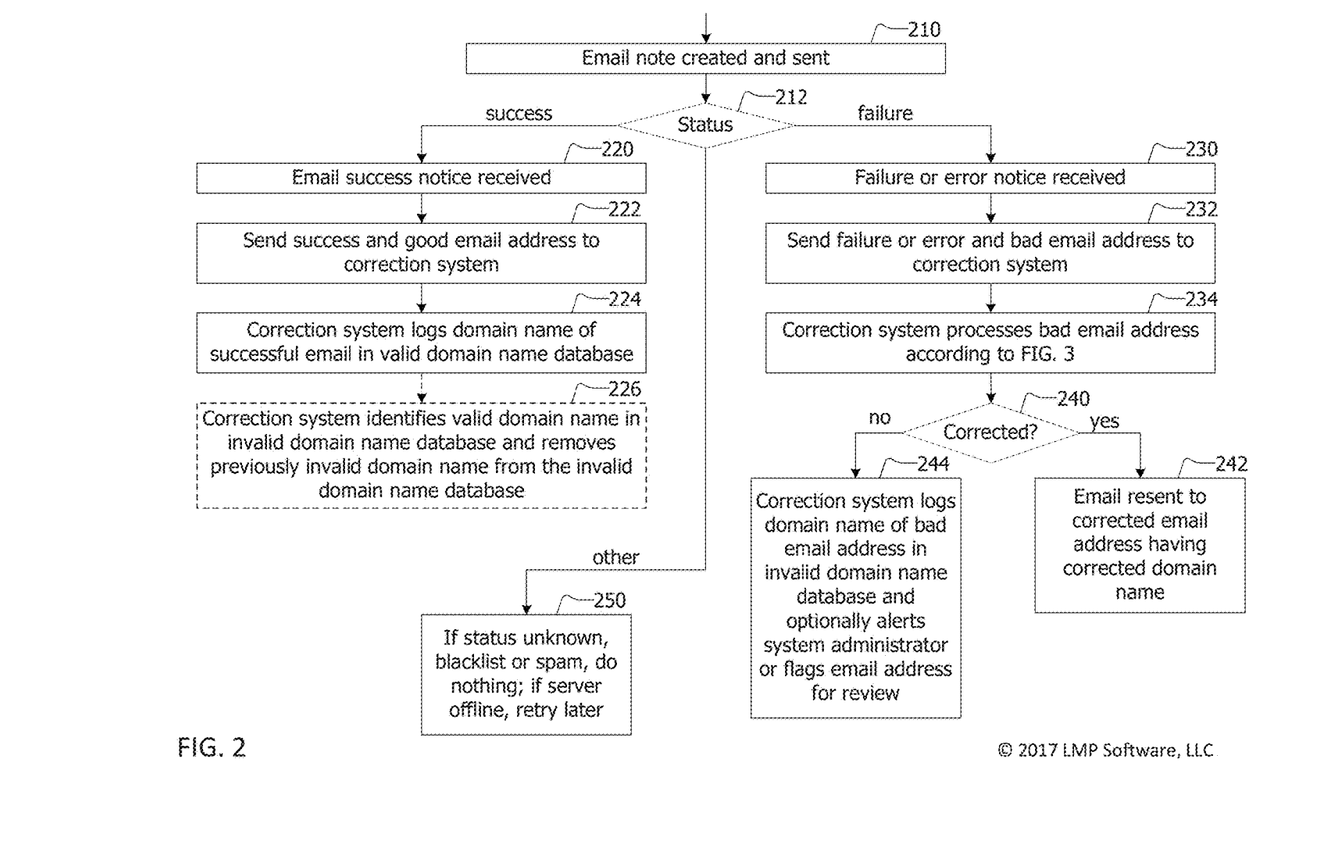
FIG. 2 is a flow chart of actions taken according to the domain name correction system and methods described herein.

The functionality of correction system 140 is described below with regard to the flow charts shown in FIGS. 2 and 3. The correction system 140 communicates through a network 120 with computing devices 110 and email providers 130. The email addresses identify the users of the computing devices 110 to whom email is directed. The network 120 comprises one or more public and/or private data networks, and other networks and sub-networks, and may include or be the Internet. The network 120 may also include or access cellular telephone and land line telephone networks, and may be wired and wireless or a combination. The network 120 includes additional devices, not shown, such as routers, switches, firewalls, multiplexors and other networking equipment that enable and enhance network communications. Additional specialized servers such as application servers, database servers, and others may be coupled with or included with the correction system 140 and/or the email provider 130 or may be accessed by the correction system 140 over network 120. Although only one email provider 130 is shown, multiple email providers may be involved in this environment.

Description of Processes

The system and methods described herein provide for the correction of the domain name portion of email addresses. Referring now to FIG. 2, a flow chart of actions taken to correct domain names is presented. The method and this disclosure refers to domain names. The method is equally applicable to all levels of domain names even though this disclosure focuses on second level and top level domain names. That is, there are multiple levels of domain names in addition to top and second level, and the methods described herein also apply to those. Specifically, an email address with multiple level domain names may be username@fourth.third.second.toplevel, where fourth, third and second are the other domain name level in addition to top level. The methods described herein references domain name and applies to all levels of domain names included in an email address. Further, the method is equally applicable to domain names in languages and alphabets other than English and is applicable and may be used with Internationalized Domain Names (IDNs).

To start the method, an email note is created and sent, as shown in block 210. The creation of the email note may be by an individual or by an automated emailing system that sends the same or similar email notes to multiple recipients, such as advertisements, promotions and newsletters. When using a personal email system, when a good, valid email address is used, a delivery receipt or a similar success notice may be requested and received. When using a commercial email system, when a good, valid email address is used, it is commonplace that a success notice is received. When using a personal or commercial email system, when a bad, invalid email address is used, a failure notice is received. After the email note is sent, a check is made on the status of the email note, as shown in block 212. When the email note was successfully sent, an email success notice is received, as shown in block 220. The success notice and good email address are sent to and received by the correction system, as shown in block 222. The correction system then logs the domain name of the successful email in the valid domain name database, as shown in block 224. In another embodiment, the system assumes the email was successful after a certain period of time passes without receipt of a failure notice, for example, 1 minute, 5 minutes, 15 minutes, 1 hour, 2 hours and others. After the designated time period passes, in this embodiment, the correction system adds the domain name of the email address to the valid domain name database. In this way, the system uses machine learning to adapt and improve its functioning over time. The correction system may also, optionally, use the valid domain name to identify a valid domain name in an invalid domain name database and remove the previously invalid domain name from the invalid domain name database, as shown in block 226. In this way, the system uses machine learning to adapt and improve its functioning over time.

When the check does not receive a status or reveals that a status is unknown, blacklist or spam, nothing is done, or if the receiving or destination server is offline, an attempt to resend the email to the email address and retried later, as shown in block 250.

When delivery of the email note fails, an email failure or error notice is received, as shown in block 230. The failure or error and bad email address is sent to and received by the correction system, as shown in block 232. To attempt to resend the failed email to a corrected email address, the correction system processes the bad email address according the method presented in FIG. 3. A check is made to determine if the domain name of the failed email address was corrected, as shown in block 240. If the domain name of the failed email address was corrected, the email is resent to the corrected email address having the corrected domain name, as shown in block 242. The correction system may log the domain name of the bad email address and its correction in a bad or invalid domain name database. If the domain name of the failed email address could not be corrected, the correction system logs the domain name of the bad email address in the invalid domain name database and optionally alerts a system administrator or flags the email address for review, as shown in block 244.

Figure 3:
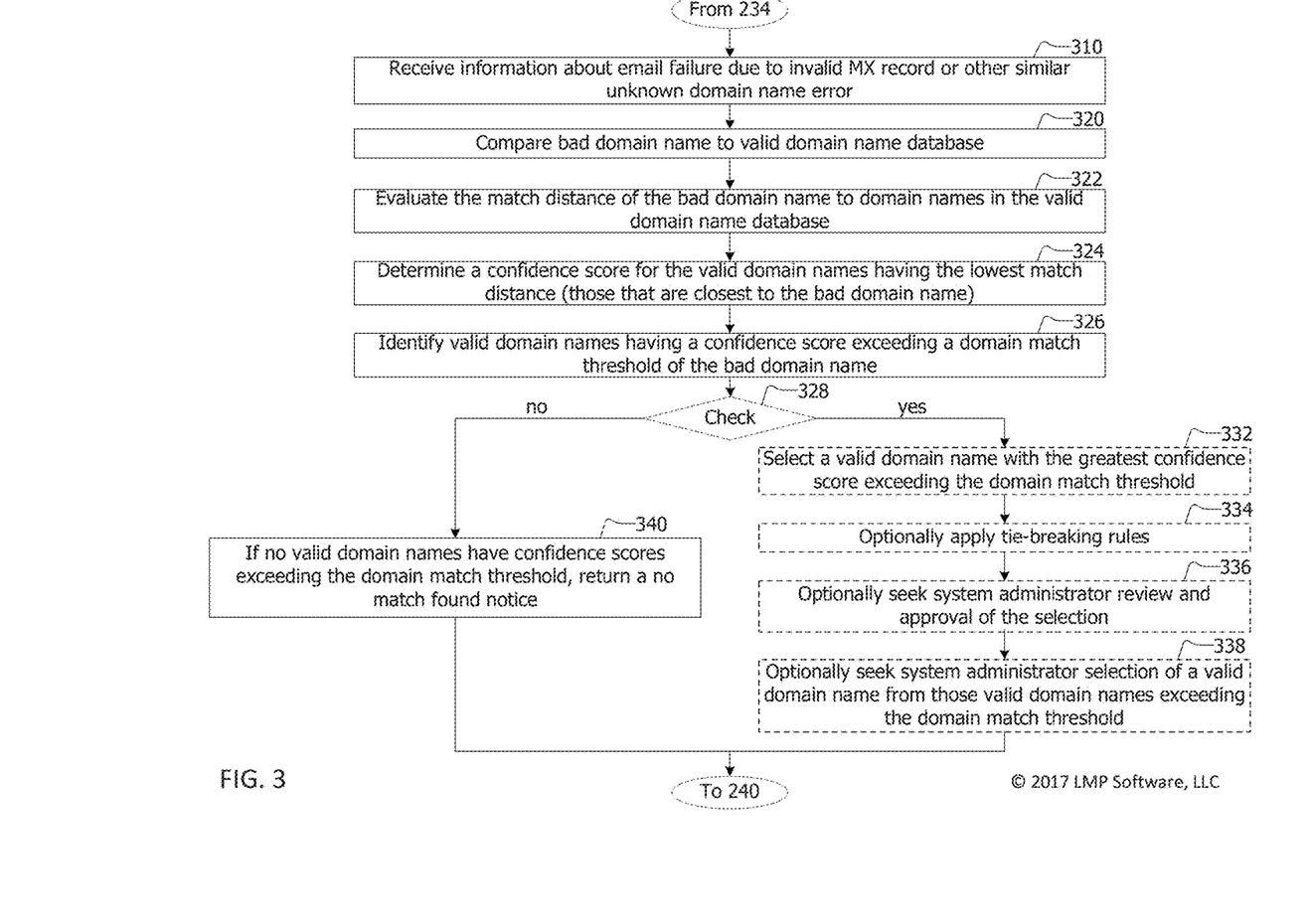
FIG. 3 is a flow chart of the actions taken to evaluate and correct email addresses according to the domain name correction system and methods described herein.

Referring now to FIG. 3, a flow chart of the actions taken to evaluate and correct the domain name portions of email addresses is presented. After a failed email address is detected in block 212, an attempt to correct the domain name of the email address is made as recited in block 234. The correction system receives information about email failure due to invalid MX record or other similar unknown domain name error, as shown in block 310. The correction system compares the bad domain name to domain names contained in a valid domain name database maintained by the correction system, as shown in block 320. The correction system evaluates the match distance of the bad domain name to domain names in the valid domain name database, as shown in block 322. In one version of the correction system, this may be achieved by calculating the Levenshtein Distance between the invalid or bad domain name and those domain names in a database of good or valid domain names. In one embodiment, the correction system selects a subset of stored valid domain names for distance evaluation. In another embodiment, the correction system calculates distances between the bad domain name and all domain names in the valid domain name database. The distance evaluation may also consider other factors such as location of letters, numbers or characters on a keyboard, typical typographical errors, popularity of the domain name, and the like. A confidence score is then calculated incorporating the distance.

The correction system determines a confidence score for the valid domain name, as shown in block 324. The confidence score calculation may be limited to those valid domain names having the lowest match distance, that is, those that are closest to the bad (invalid) domain name or be computed for all domain names in the valid domain name database, as shown in block 324. In one embodiment, the correction system calculates the confidence score by dividing the distance by the greater of the length of the invalid domain name and the valid domain name. The result is then subtracted from 1 to obtain the confidence score. When the result of the division is greater than 1, the text body match is 0%. The confidence score evaluation is reflected in the following equation where $M_t$ refers to a percentage likelihood of a domain name text match.

$$M_t = 1 - \text{Min}\left(\frac{\text{Distance(invalid domain name, valid domain name)}}{\text{Max(invalid domain name length, valid domain name length)}}, 1\right)$$

After the confidence score is calculated, the correction system identifies valid domain names having a confidence score exceeding a domain match threshold of the bad domain name, as shown in block 326. The domain match threshold may adapt or evolve based on the functioning of the correction system using heuristics and machine learning. The domain match threshold is a cut-off below which valid domain names are not considered to likely be correct or good replacement domain names of the invalid domain name. Initially, in one embodiment, the correction system starts at 70% confidence with a preferred distance of 3 and, then over time, the correction system learns which confidence levels and distances are approved based on human review. Other stating values may be used, such as, for example, 72%, 75%, 68%, 80% and others. The domain match threshold fluctuates, adapts and evolves over time based on ongoing calculation and experience including the oversight and approval of system administrators until a confidence level is reached for the domain match threshold. The correction system checks whether there are valid domain names with confidence scores that exceed the domain match threshold, as shown in block 328.

When there are no valid domain names with confidence scores that exceed the domain match threshold, the correction system returns a no match found notice or indication, as shown in block 340. The flow of action then continues at block 240 of FIG. 2.

When there are valid domain names with confidence scores that exceed the domain match threshold, the correction system may take one or more of four actions. The correction system may automatically select a single valid domain name with the greatest confidence score exceeding the domain match threshold, as shown in block 332. As appropriate, the correction system may optionally apply tie-breaking rules, as shown in block 334. These tie-breaking rules may be applied by the correction system automatically when the confidence score for two or more correction candidates is the same. The tie-breaking rules include, for example, selecting the most popular domain name based on number of subscribers or users for that domain name or size of the organization or company represented by the domain name. Another example rule the correction system can apply as a tie-breaker is to select the candidate valid domain name with the closest keyboard distance. The correction system may optionally seek system administrator review and approval of the automatic selection of blocks 332 and/or 334 or in exceptional circumstances, such as when there are too many (that is, greater than a system defined maximum) close candidate valid domain names, as shown in block 336. Alternatively and/or optionally, the correction system may seek system administrator selection of a valid domain name from those valid domain names exceeding the domain match threshold, as shown in block 338. The correction system may monitor the selections made by system administrators in blocks 336 and 338 and change the domain match threshold based on the selections made by system administrators in blocks 336 and 338. In the way, the correction system adapts and evolves using machine learning. The flow of action then continues at block 240 of FIG. 2.

Figure 4:
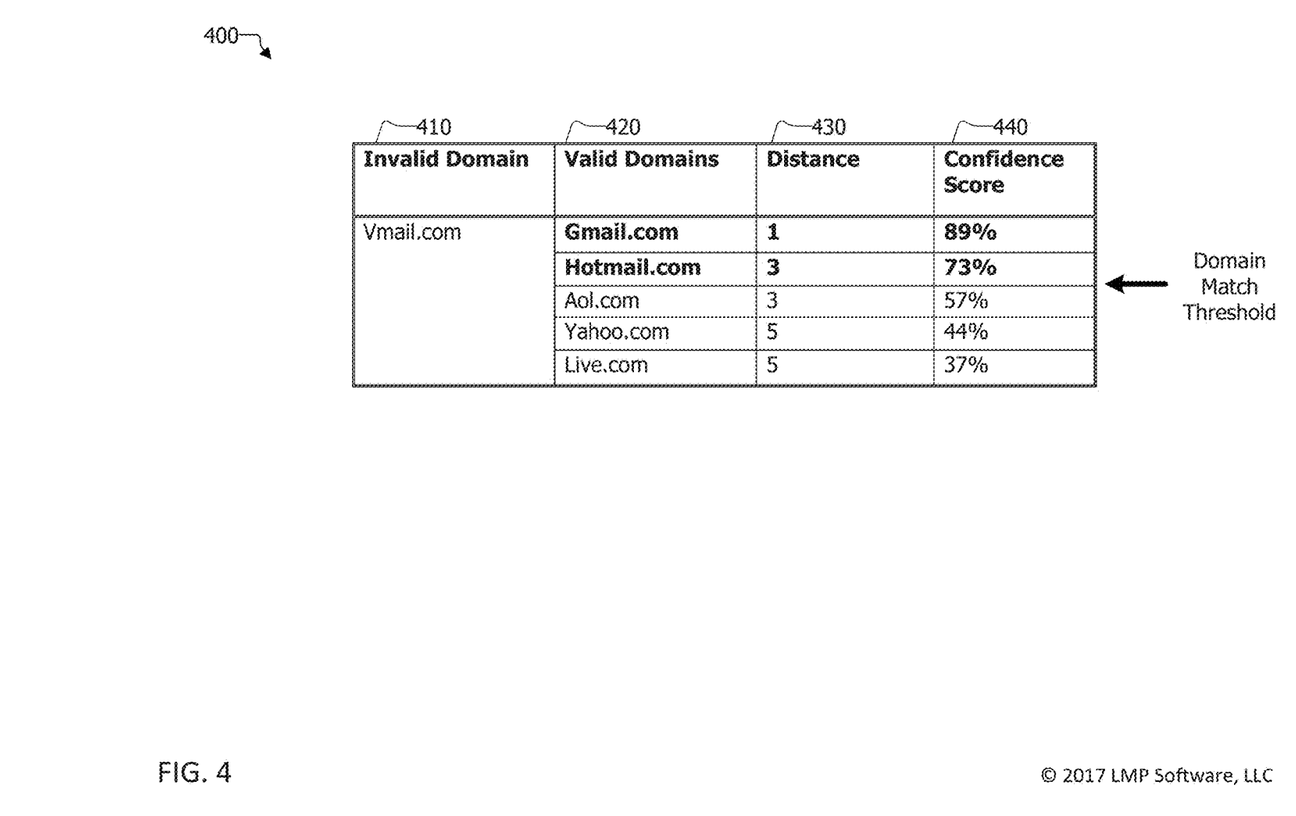
FIG. 4 is a table showing invalid second level domain names compared to valid second level domain names.
Figure 5:
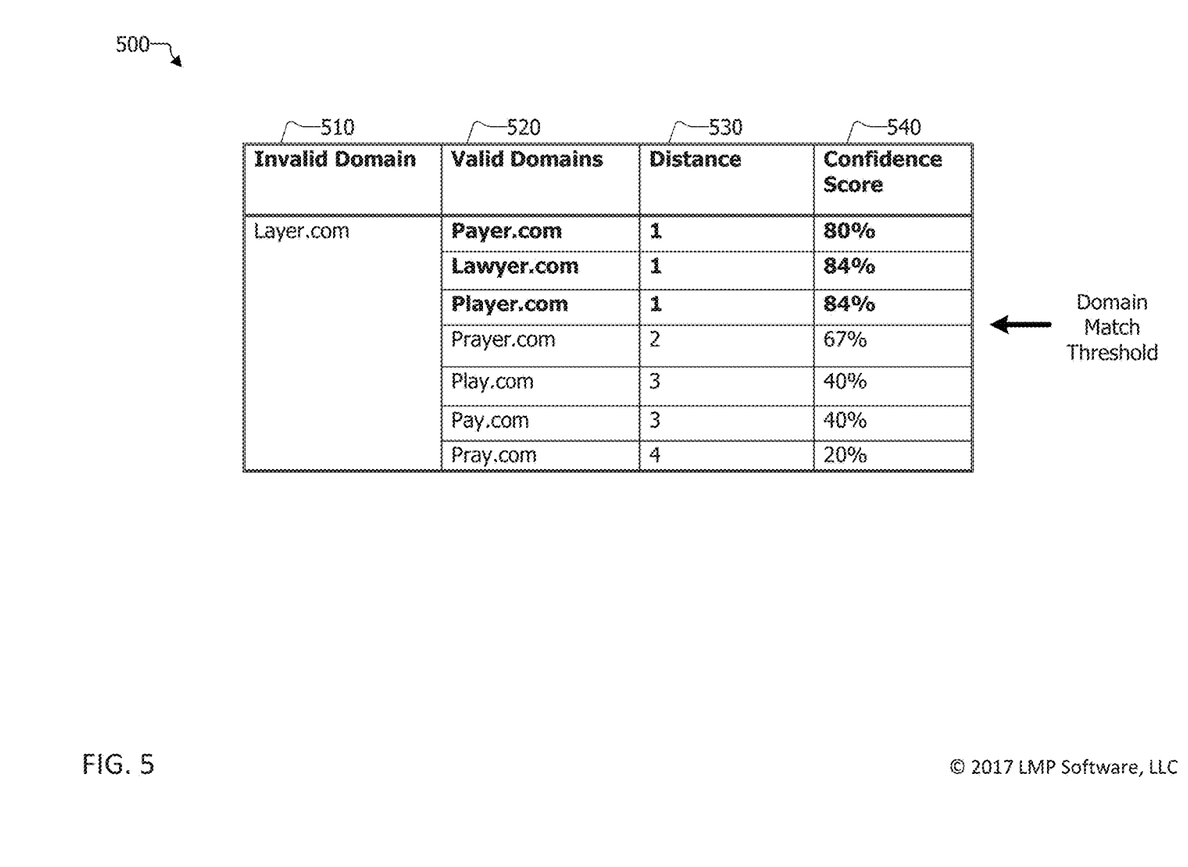
FIG. 5 is a second table showing invalid second level domain names compared to valid second level domain names.
Figure 6:
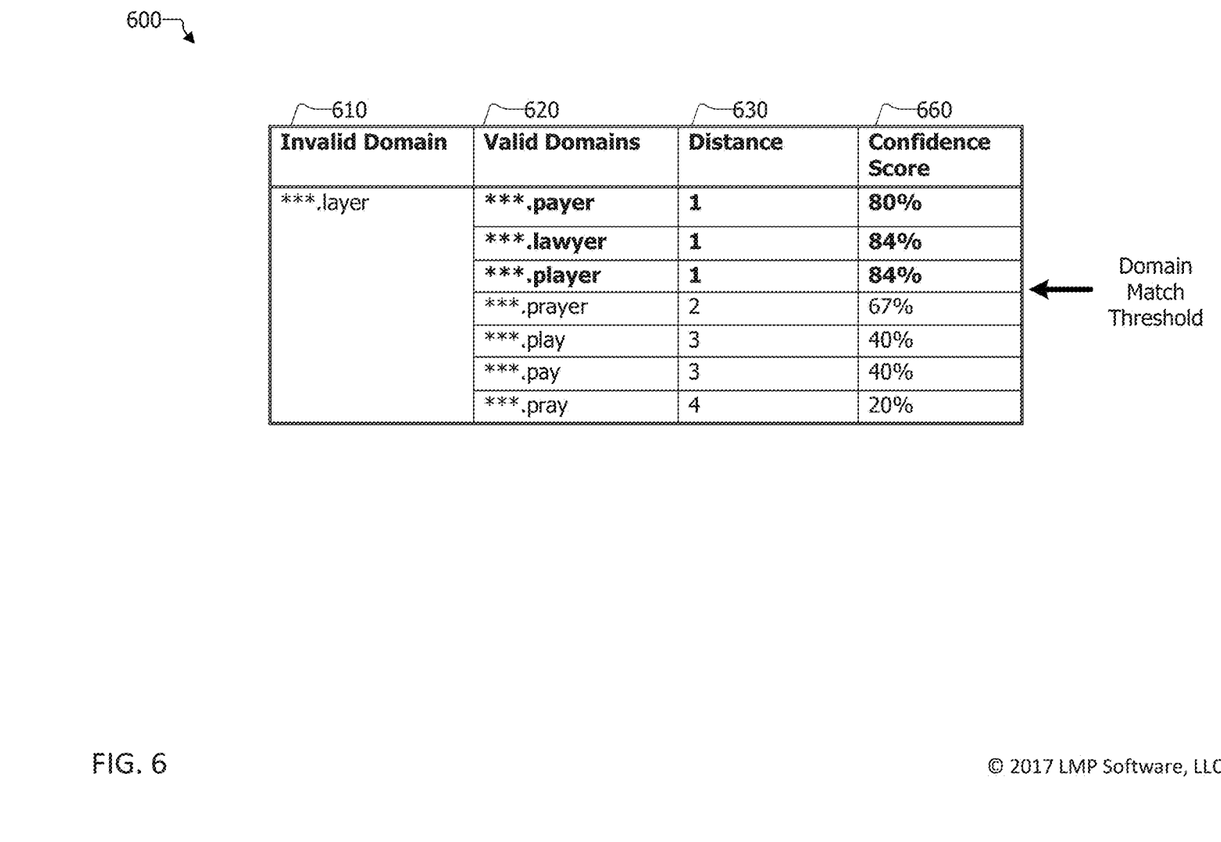
FIG. 6 is a table showing newer invalid top level domain names compared to valid top level domain names.

Examples of implementation of the methods provided herein are shown in conjunction with the tables provided in FIGS. 4, 5 and 6. Referring now to FIG. 4, table 400 shows that an email note was sent to username@Vmail.com. In this example, the domain name that is bad that results in a failed email attempt is the second level domain vmail. The correction system receives notification that email to username@Vmail.com failed and attempt to correct the email address by replacing the invalid second level domain 410 name with a valid second level domain. The correction system identifies domain names that have a certain distance from the invalid domain name. The valid domain names are shown in column 420. The distances between candidate domain names and the invalid domain name are computed as described above. In this example, the closest distance domain names are not listed, but, instead, well known second level domain name are listed to show how the method functions. The distance between the valid domain name gmail and invalid domain name vmail is 1, the distance between vmail and each of hotmail and aol, is 3, while the distance between vmail and each of yahoo and live is 5. In practice, a confidence score is computed for those valid domain names with the closest distance. In this example, the confidence score is computed for the example second level domain names which are shown for explanatory purposes. The confidence score is calculated as described above, based on the distance and the length of both the valid and invalid domain names. The confidence score is shown in column 440. According to one implementation of the correction system, gmail.com is selected as the corrected domain name as it has the highest confidence score. If two or more domain names have the same confidence score, additional evaluation could automatically be made based on one or a combination of factors or heuristics, including most popular domain names (based on number of subscribers or users for that domain name or size of the organization or company represented by the domain name), typical typographic errors and others. Alternatively, when two or more domain names have the same confidence score the results could be flagged and/or provided to a system operator for review.

Another example is provided in table 500 in FIG. 5, an email failure from an email note attempted to username@layer.com resulting from the invalid domain name layer.com in column 510 is identified. The correction system evaluates valid domain names to replace the second level domain name layer. This includes referring to a database of valid second level domain names. Here, column 520 lists candidate valid second level domain names. The distances between candidate top level domain names and the invalid top level domain name are computed as described above. Domain names payer.com, lawyer.com and player.com are a distance 1 from the invalid domain name layer.com. The top level domain names are listed along with the second level domain names in this paragraph and in FIG. 5 for ease of reference. Domain name prayer.com is a distance 2 from layer.com. Domain names play.com and pay.com are a distance 3 from layer.com. And pray.com is a distance 4 from layer.com.

A confidence score is computed based on the distance and the length of both the valid and invalid domain names as described above. The confidence score is shown in column 540. Here, two second level domain names have the same confidence score of 84%. As such, additional evaluation could automatically be made based on one or a combination of factors including most popular second level domain names, typical typographic errors and others. Alternatively, when two or more second level domain names have the same confidence score, the results could be flagged and/or provided to a system operator for review. Similarly, alternatively, all second level domain names above the domain match threshold, here, for example, 78% or 82%, could be sent to a system administrator or flagged for review. In another implementation, when two or more second level domain names have the same confidence score, they are evaluated against further rules, such as, shorter domain names are preferred, dictionary names are preferred, brand names are preferred, longer domain names are preferred, the most popular domain (in terms of usage or successful emails sent) and other rules and heuristics. In another implementation, all second level domain names above the domain match threshold are evaluated against further rules, such as, shorter domain names are preferred, dictionary names are preferred, brand names are preferred, longer domain names are preferred and other rules.

The methods provided herein are applicable to the newer top level domain names just as they are applicable to second level domain name (and any other multi-level domains). Referring now to FIG. 6, table 600 provides an example of top level domain names similar to the example shown in table 500 of FIG. 5 for second level domain names. In this example, an email failure from an email note attempted to username@*.layer resulting from the invalid top level domain name layer.com shown in column 610 is identified. The three asterisks are merely placeholders for a second level domain name. The correction system evaluates valid top level domain names to replace the invalid top level domain name layer. This includes referring to a database of valid top level domain names. Here, column 620** lists candidate valid top level domain names. The distances between candidate top level domain names and the invalid top level domain name are computed as described above.

Domain names *.payer, *.lawyer and *.player are a distance 1 from the invalid top level domain name *.layer. Domain name *.prayer is a distance 2 from layer.com. Domain names *.play and *.pay are a distance 3 from layer.com. And *.pray is a distance 4 from ***.layer.

A confidence score is computed based on the distance and the length of both the valid and invalid top level domain names as described above. The confidence score is shown in column 660. Here, two domain names have the same confidence score of 84%. As such, additional evaluation could automatically be made based on one or a combination of factors including most popular domain names, typical typographic errors and others. Alternatively, when two or more domain names have the same confidence score, the results could be flagged and/or provided to a system operator for review. Similarly, alternatively, all domain names above the domain match threshold, here, for example, 78% or 82%, could be sent to a system administrator or flagged for review. In another implementation, when two or more domain names have the same confidence score, they are evaluated against further rules, such as, shorter domain names are preferred, dictionary names are preferred, brand names are preferred, longer domain names are preferred and other rules. In another implementation, all domain names above the domain match threshold are evaluated against further rules, such as, shorter domain names are preferred, dictionary names are preferred, brand names are preferred, longer domain names are preferred and other rules.

In addition to the methods described herein regarding correcting domain names in email addresses that have failed after being sent, the methods may be applied to email addresses before an attempt is made to send an email address. Prior to sending an email note, the domain names in the recipient email address may be evaluated according the methods described herein. Specifically, a check may be made whether the domain name is in a valid domain name database. When the domain name is not in the valid domain name database, suggested corrected domain names may be provided. In another version, the correction system may automatically correct domain names according to the methods described herein before an email is sent to a specified invalid domain name. That is, after it is determined that the domain name is not in the valid domain name database, evaluation according to blocks 320, 322, 324 and 326 of FIG. 3 (described above) may be performed to identify candidate replacement corrected domain names. Depending on the implementation, the correction system may present identified candidate replacement corrected domain names for review and selection by a user or system administrator, or the best candidate with the highest confidence score could be recommended or automatically used in place of the possibly (or likely) bad domain name in the email address. If no candidate replacement corrected domain names are identified having a sufficiently high confidence score, the correction system may provide a warning to a user or system administrator prior to sending the email note with instructions to check whether the email address is correct. These methods may be implemented in consumer facing email client applications such as, for example, MICROSOFT OUTLOOK and APPLE MAIL or in a dash board or control panel of a commercial email system.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for correcting domain names in email addresses to increase email success, the method performed by a correction system implemented on at least one server having at least one processor and memory, the method comprising:
   the correction system sending a plurality of email to the plurality of email addresses;
   the correction system receiving email failure information including a bad domain name for some of the email addresses;
   for each of the email addresses for which failure information is received, the correction system:
      comparing the bad domain name to valid domain names in a valid domain name database including evaluating a match distance of the bad domain name to valid domain names in the valid domain name database, wherein the evaluating the match distance comprises computing a Levenshtein Distance;
      determining confidence scores for the valid domain names based on the match distance, wherein the confidence scores are evaluated by dividing the match distance by the greater of a length of the invalid domain name and the valid domain name, and subtracting a result of the dividing from 1, such that when the result of the dividing is greater than 1, the confidence score is 0% as reflected by $$M_t = 1 - \text{Min}\left(\frac{\text{Distance(invalid domain name, valid domain name)}}{\text{Max(invalid domain name length, valid domain name length)}}, 1\right);$$

the correction system identifying valid domain names having confidence scores exceeding a domain match threshold;
   the correction system selecting a valid domain name with a confidence score exceeding the domain match threshold as a corrected domain name;
   the correction system sending an email note to the corrected domain name.

2. The method of claim 1 wherein the selecting a valid domain name comprises selecting a single valid domain name with the greatest confidence score exceeding the domain match threshold.

3. The method of claim 1 wherein the selecting a valid domain name comprises applying tie-breaking rules when there are multiple valid domain names with a greatest confidence score exceeding the domain match threshold.

4. The method of claim 1 further comprising the correction system obtaining system administrator review of the selecting.

5. The method of claim 1 wherein the selecting includes seeking system administrator selection of a single valid domain name from those valid domain names exceeding the domain match threshold.

6. The method of claim 1 wherein the domain match threshold is an evolving value based on ongoing performance of the method.

7. The method of claim 1 further comprising:
   the correction system checking whether there are valid domain names having a confidence score exceeding a domain match threshold;
   when there are no valid domain names with confidence scores exceeding the domain match threshold, the correction system providing a no match found notice.

8. The method of claim 1 wherein the bad domain name is a second level domain name.

9. The method of claim 1 wherein the bad domain name is a top level domain name with character length greater than 3.

10. A storage medium storing a program of a correction system having instructions stored thereon which when executed by a processor cause the processor to perform operations comprising:
   sending a plurality of email to the plurality of email addresses;
   receiving email failure information including a bad domain name for some of the email addresses;
   for each of the email addresses for which failure information is received
      comparing the bad domain name to valid domain names in a valid domain name database including evaluating a match distance of the bad domain name to valid domain names in the valid domain name database, wherein the evaluating the match distance comprises computing a Levenshtein Distance;
      determining confidence scores for the valid domain names based on the match distance, wherein the confidence scores are evaluated by dividing the match distance by the greater of a length of the invalid domain name and the valid domain name, and subtracting a result of the dividing from 1, such that when the result of the dividing is greater than 1, the confidence score is 0% as reflected by $$M_t = 1 - \text{Min}\left(\frac{\text{Distance(invalid domain name, valid domain name)}}{\text{Max(invalid domain name length, valid domain name length)}}, 1\right);$$

identifying valid domain names having confidence scores exceeding a domain match threshold;

selecting a valid domain name with a confidence score exceeding the domain match threshold as a corrected domain name;

sending an email note to the corrected domain name.

11. The storage medium of claim 10 wherein the selecting a valid domain name comprises selecting a single valid domain name with the greatest confidence score exceeding the domain match threshold.

12. The storage medium of claim 10 wherein the selecting a valid domain name comprises applying tie-breaking rules when there are multiple valid domain names with a greatest confidence score exceeding the domain match threshold.

13. The storage medium of claim 10 further comprising obtaining system administrator review of the selecting.

14. The storage medium of claim 10 wherein the selecting includes seeking system administrator selection of a single valid domain name from those valid domain names exceeding the domain match threshold.

15. The storage medium of claim 10 wherein the domain match threshold is an evolving value based on ongoing performance of the operations.

16. The storage medium of claim 10 further comprising:

checking whether there are valid domain names having a confidence score exceeding a domain match threshold;

when there are no valid domain names with confidence scores exceeding the domain match threshold, providing a no match found notice.

17. The storage medium of claim 10 wherein the bad domain name is a second level domain name.

18. The storage medium of claim 10 wherein the bad domain name is a top level domain name with character length greater than 3.

* * * * *